US005633941A

United States Patent [19]

Huang

[11] Patent Number: 5,633,941

[45] Date of Patent: May 27, 1997

[54] CENTRALLY CONTROLLED VOICE SYNTHESIZER

[75] Inventor: Chi-mao Huang, Toutiu, Taiwan

[73] Assignee: United Microelectronics Corp., Taiwan

[21] Appl. No.: 296,514

[22] Filed: Aug. 26, 1994

[51] Int. Cl.[6] .......... G09B 15/04

[52] U.S. Cl. .......... 381/118; 84/611

[58] Field of Search .......... 84/611, 635, 667; 381/118

[56] References Cited

U.S. PATENT DOCUMENTS

| | | | |
|---|---|---|---|
| 4,256,005 | 3/1981 | Mishima | 84/667 |
| 4,958,551 | 9/1990 | Lui | 84/611 |
| 4,960,031 | 10/1990 | Farrand | 84/611 |
| 4,991,486 | 2/1991 | Ito et al. | 84/611 |
| 5,235,124 | 8/1993 | Okamura et al. | 84/601 |

*Primary Examiner*—Edward L. Coles, Sr.
*Assistant Examiner*—Stephen Brinich
*Attorney, Agent, or Firm*—Hedman, Gibson & Costigan, P.C.

[57] ABSTRACT

A centrally controlled voice synthesizer includes a memory which is preprogrammed with voice data, melody data, address data, and control data, an input processor for receiving an external signal and outputting a triggering signal, a clock generator for generating clock signals; a control logic unit receiving the clock signal from the clock generator, being triggered by the triggering signal from the input processor thus fetching the voice data, the melody data, the address data, and the control data from the memory, a decoder decodes the data fetched from the memory via the logic control unit and generates a control signal, a rhythm generator for outputting a rhythm signal to the logic control unit upon receiving the clock signal from the clock generator and the control signal from the decoder, a digital-to-analog converter connected to the memory and converts digital voice data from the memory to analog voice signal, a transistor connected to the digital-to-analog converter for amplifying the analog voice signal and driving an external speaker to emit corresponding voice duplication.

2 Claims, 3 Drawing Sheets

CENTRALLY CONTROLLED VOICE SYNTHESIZER

BACKGROUND OF THE INVENTION

1. Field of the Invention

The present invention relates to a centrally controlled voice synthesizer, and more particularly to one which mangages the memory therein in a centralized manner thus optimizing the finite memory.

2. Description of the Prior Art

A voice synthesizer is a device which is used to duplicate voice including melody and/or speech and emits the voice duplication from a speaker connected thereto. Normally the voice duplication emitted from the synthesizer is composed of a plurality of "sections" each of which comprises a plurality of "words". FIG. 5 illustrates a plurality of words as labeled WORD(1), WORD(2), . . . , WORD(N). Each word comprises a plurality of data bits. For example, WORD (1) comprises a plurality of data bits such as DATA(1), DATA(2), . . . , DATA(K1). Each word is deemed as a small unit of a voice and may be one or several syllables of a voice. FIG. 6 illustrates a conventional voice synthesizer which comprises a voice-controlled circuit 90 connected to a voice memory 91, an address memory 92, a control memory 93, a timing circuit 94, a decoder 95, and an input circuit 96. The voice memory 91 has its output connected to a digital-to-analog (D/A) converter 97 which is connected to a speaker 98. A code selection circuit 99 is connected between the input circuit 96 and the decoder 95. The voice memory 91 stores voice data. The address memory 92 stores a beginning address and an end address for each word. The control memory 93 stores silent data and a terminating signal for each "section" of the voice. The code selection circuit 99 is used to deal with input/output signals. From the above, it is understood that the control data and voice data are dispersedly stored in the code selection circuit 99, the address memory 92, the control memory 93, and the voice memory 91. This dispersed arrangement of the memories 91, 92, and 93 results in complicated wiring and software programming thus increasing inconvenience and cost.

The present invention has arisen to mitigate and/or obviate the afore-described disadvantages of the conventional voice synthesizer.

SUMMARY OF THE INVENTION

The primary objective of the present invention is to provide a voice synthesizer which provides an optimal arrangement in the memory thus simplifying the wiring and software on the memory.

In accordance with one aspect of the invention, there is provided a centrally controlled voice synthesizer comprising a memory which is preprogrammed with voice data, address data, and control data;

an input processor for receiving an external signal and outputting a triggering signal;

a clock generator for generating clock signals;

a control logic unit receiving the clock signal from the clock generator, being triggered by the triggering signal from the input processor thus fetching the voice data, the address data, and the control signal from the memory;

a decoder decodes the data fetched from the memory via the logic control unit and generates a control signal;

a rhythm generator for outputting a rhythm signal to the logic control unit upon receiving the clock signal from the clock generator and the control signal from the decoder;

a digital-to-analog converter connected to the memory and converts digital voice data from the memory to an analog voice signal; and a transistor connected to the digital-to-analog converter for amplifying the analog voice signal and driving an external speaker to emit corresponding voice.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
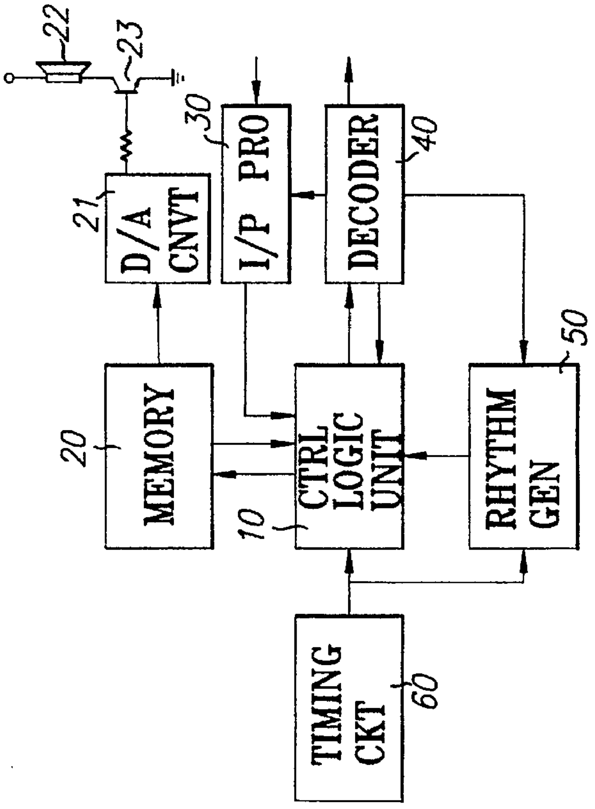
FIG. 1 is a schematic block diagram in accordance with the present invention.

Referring to FIG. 1, a voice synthesizer in accordance with the present invention comprises a control logic unit 10 functioning as a control center, a memory 20, an input processor 30, a decoder 40, a rhythm generator 50, and a timing circuit 60. The memory 20 has an output terminal thereof connected to a digital-to-analog (D/A) converter which is connected to a speaker 22 via a transistor 23. The speaker 22 emits voice duplication according to voice data outputted from the output terminal of the memory 20.

The control logic unit 10 reads control code from a heading of the memory 20 upon receiving a triggering signal from the input processor 30 and then forwards the read control code to be decoded in the decoder 40 from which a control signal is outputted in response to the control code read from the heading of the memory 20.

The memory 20 has defined a hierarchy structure of data for simultaneously storing voice data, melody data, address data, and control signal. The detailed of the hierarchy structure of data will be described in detail later.

The input processor 30 receives an input signal sent thereto and generates a triggering signal in response to the control signal from the decoder 40.

The decoder 40 decodes the data read from the memory via the control logic unit 10 and generates a control signal.

The rhythm generator 50 generates a timing control signal for controlling the melody signal emitted from the memory 20.

The digital-to-analog converter 21 converts the voice data, which is digital form, to analog voice signal by which the speaker 22 is driven to emit the corresponding sound.

The timing circuit 60 generates a timing signal and forwards the timing signal to the control logical unit 10 and the rhythm generator 50.

From the above discussion, it can be summarized that the logic control unit 10 reads the hierarchy voice data from the memory 20; the decoder 40 decodes the hierarchy voice data from the memory 20 and provides a control signal to the input processor 30, the input processor 30 which cooperates with the inputted signal and outputs a control signal to the control logic unit 10 thus enabling operation of the whole system.

Figure 2:
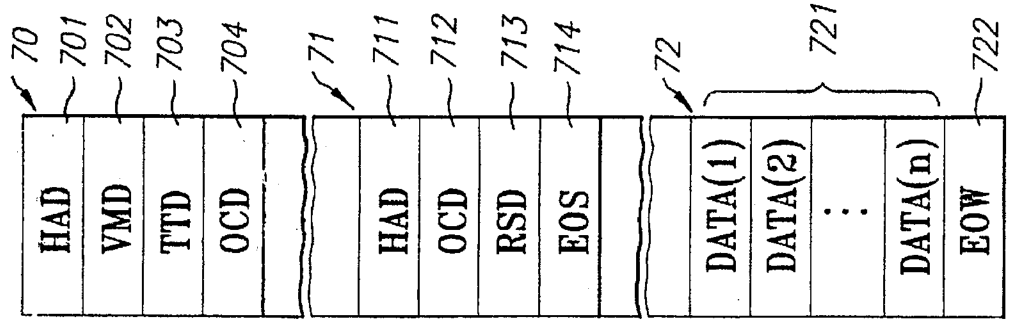
FIG. 2 is a hierarchy structure of memory management of the voice synthesizer of the present invention.

FIG. 2 illustrates the hierarchy structure of the voice data in the memory 20. The arrangement of the memory 20 is substantially classified into three types which are section heading 70, word heading 71, and word data table 72. The section heading 70 includes heading address data (HAD) 701, voice or melody data (VMD) 702, triggering type data 703, and output control data (OCD) 704. The word heading 71 includes heading address data (HAD) 711, output control data (OCD) 712, rhythm setting data (RSD) 713, and end of section data (EOS) 714. The word data table 72 includes a plurality of data units 721 such as DATA(1), DATA(2), . . . , DATA(n), and an end of word data (EOW) 722. Each data unit 721 may contains four, five, six or seven data bits depending on an encoding manner.

Figure 4:
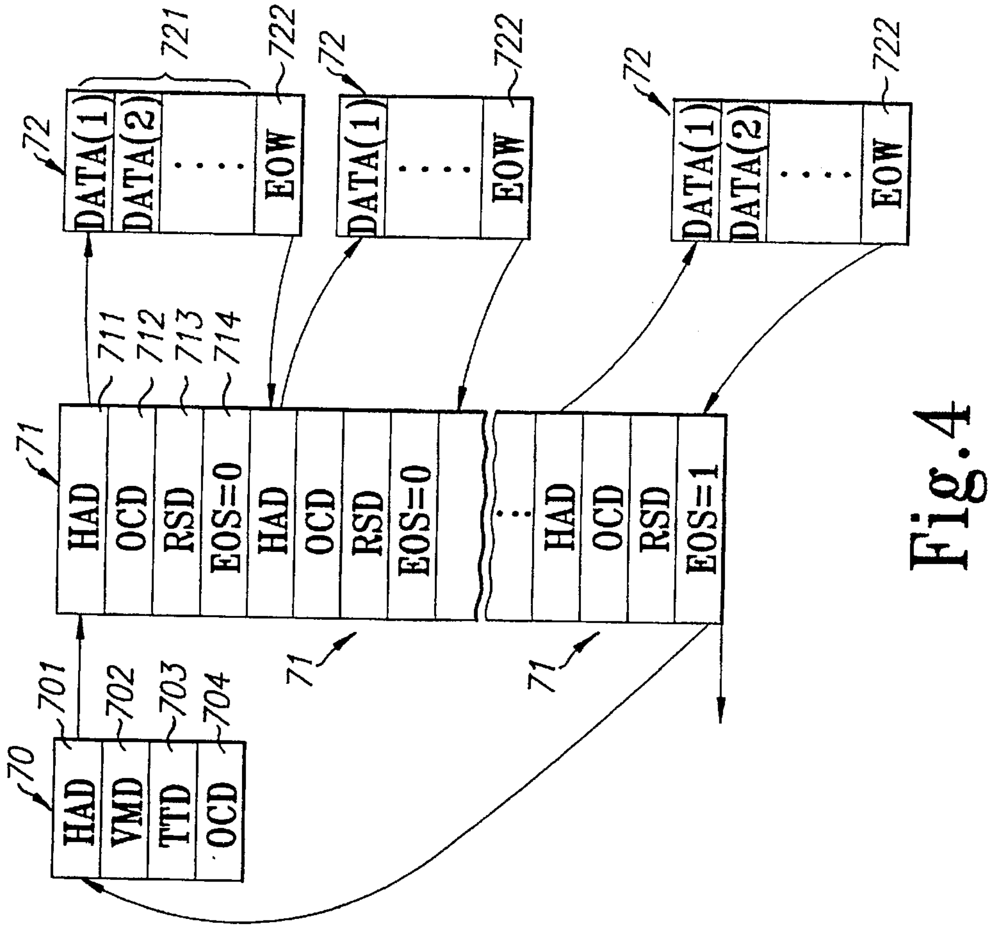
FIG. 4 is flow chart for reading the hierarchy voice data of the present invention.
Figure 3:
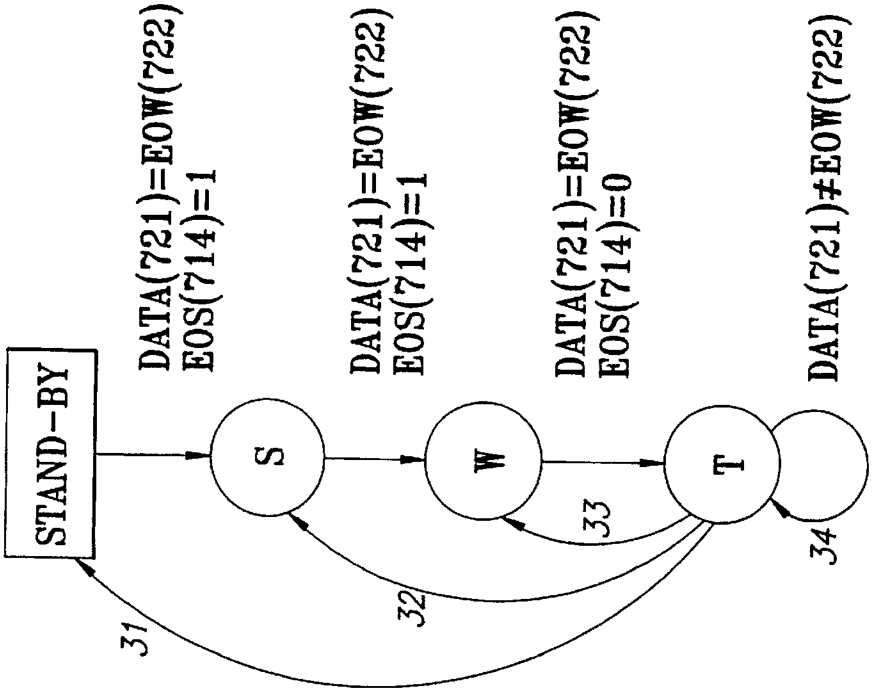
FIG. 3 is a state processing flow chart of a control logic unit in accordance with the present invention.
Figure 5:
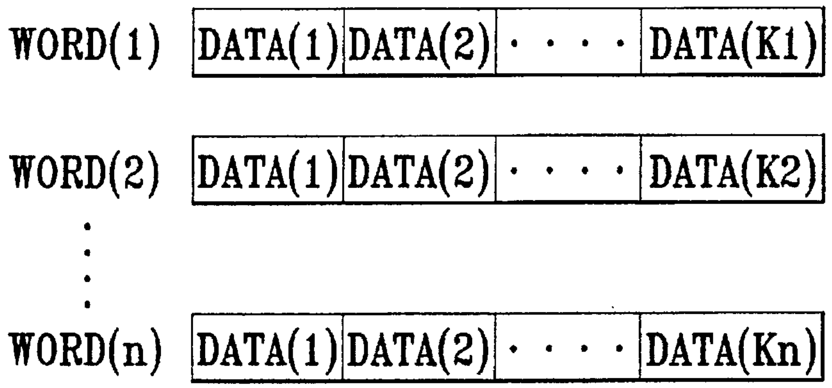
FIG. 5 is an example for defining the voice data used in the voice synthesizer.
Figure 6:
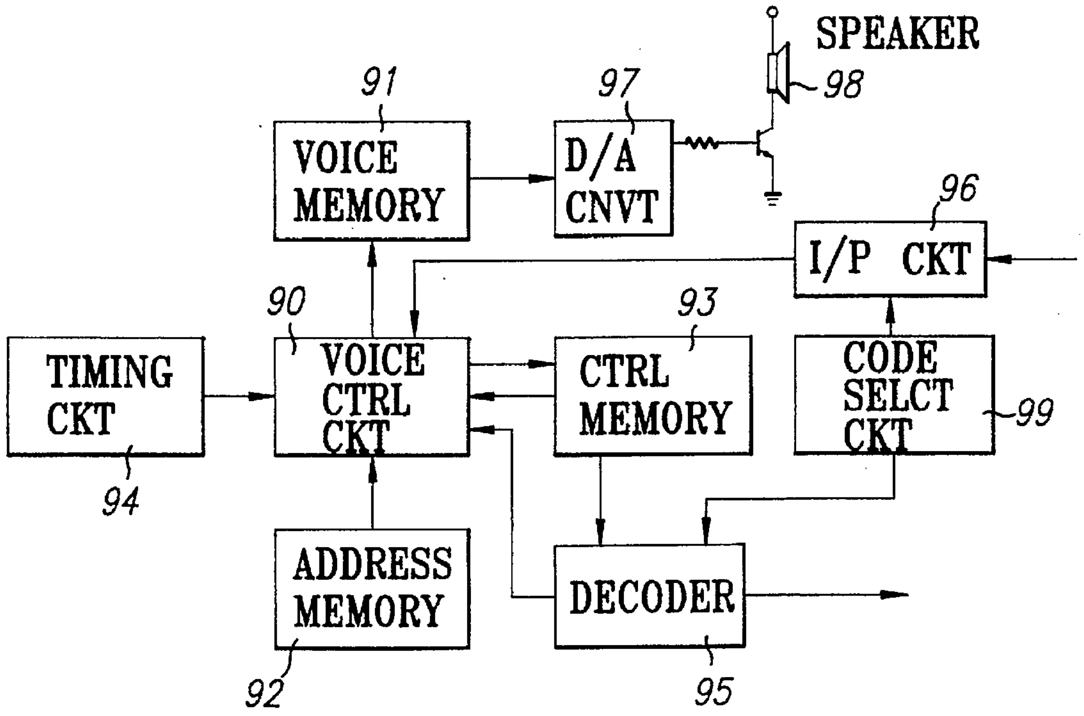
Fig.6 PRIOR ART
FIG. 6 is a conventional circuit block diagram of a voice synthesizer.

FIGS. 3 and 4 should be referred together for easy understanding data accessing on the memory 20. FIG. 3 is a state processing flow chart of the control logic unit 10 and FIG. 4 is a detailed flow chart for reading the hierarchy voice data in the memory according to the flow chart of FIG. 3. The input processor 30 outputs a triggering signal to trigger the control logic unit 10 upon receiving an external trigger signal. The control logic unit 10 remains in a "STAND-BY" state 31 when it is not trigged by the input processor 30. The control logic unit 10 changes to an "S" state upon receiving the triggering signal from the input processor 30. The control logic unit 10 reads the section heading 70, fetching the control code and a heading address 701 of a first voice word in the memory 20, and forwarding the control code to the decoder 40. The decoder outputs a control signal according to the control code, and in the meantime the control logic unit 10 changes from the "S" state to a "W" state. The control logic unit 10 reads from a word heading 71 of a first word and fetches the corresponding control code and the heading address 711 of the first word, thereafter the decoder 40 receives the control code and outputs a corresponding control signal, and in the meantime the control logic unit 10 changes from the "W" state to a "T" state.

In the "T" state, the data units 721 in the memory 20 are read by the logic control unit 10 unit by unit and are forwarded to the digital-to-analog converter 21 until the end of word EOW 722 is read.

The logic control unit 10 may remain in the "T" state 34 or change to the "W" state 33, or the "S" state 32, or the "STAND-BY" state 31 according to some conditions as will be discussed as follows. A path 34 is defined from the "T" state 34 to itself when the read data unit 721 is not equal to the "end of word" data unit 722. A path 33 is defined from the "T" state to the "W" state when the read data unit 721 is equal to the "end of word" data unit 722, and the "end of section" flag EOS is equal to "0". A path 32 is defined from the "T" state to the "S" state when the read data unit 721 is equal to the "end of word" data unit 722, the "end of section" flag EOS is equal to "1", and the control logic unit 10 is still triggered by the input processor 30. A path 31 is defined from the "T" state to the "STAND-BY" state when the read data unit 721 is equal to the "end of word" data unit 722, the "end of section" flag EOS is equal to "1", and the control logic unit 10 is not triggered by the input processor 30.

The control logic unit 10 continuously reads hierarchy voice data from the memory 20 according to the above mentioned flow chart and conditions thus optimizing the memory 20.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A centrally controlled voice synthesizer comprising
   - a memory which is preprogrammed with voice data, melody data, address data, and control data;
   - an input processor for receiving an external signal and outputting a triggering signal;
   - a clock generator for generating clock signals;
   - a logic control unit for receiving the clock signal from the clock generator, receiving the triggering signal from the input processor, and fetching the voice data, the address data, and the control data from the memory upon receipt of the triggering signal;
   - a decoder for decoding the data fetched from the memory via the logic control unit and generating a control signal;
   - a rhythm generator for outputting a rhythm signal to the logic control unit upon receiving the clock signal from the clock generator and the control signal from the decoder;
   - a digital-to-analog converter connected to the memory for converting digital voice or melody data from the memory to analog voice or melody signal; and
   - a transistor connected to the digital-to-analog converter for amplifying the analog voice signal and driving an external speaker to emit corresponding voice wherein the memory has the data therein separated into a section heading, a word heading, and a word data table, where the section heading defines a heading address, voice, triggering mode, and output control data.

2. A centrally controlled voice synthesizer comprising
   - a memory which is preprogrammed with voice data, melody data, address data, and control data;
   - an input processor for receiving an external signal and outputting a triggering signal;
   - a clock generator for generating clock signals;
   - a logic control unit for receiving the clock signal from the clock generator, receiving the triggering signal from the input processor, and fetching the voice data, the address data, and the control data from the memory upon receipt of the triggering signal;
   - a decoder for decoding the data fetched from the memory via the logic control unit and generating a control signal;
   - a rhythm generator for outputting a rhythm signal to the logic control unit upon receiving the clock signal from the clock generator and the control signal from the decoder;
   - a digital-to-analog converter connected to the memory for converting digital voice or melody data from the memory to analog voice or melody signal; and
   - a transistor connected to the digital-to-analog converter for amplifying the analog voice signal and driving an external speaker to emit corresponding voice wherein the memory defines a hierarchy structure of data for simultaneously storing the voice data, the melody data, the address data, and the control data.

* * * * *